US 8,823,845 B2

(12) United States Patent
Kim et al.

(10) Patent No.: US 8,823,845 B2
(45) Date of Patent: Sep. 2, 2014

(54) COLOR FILTER ARRAY, IMAGE SENSOR HAVING THE SAME, AND IMAGE PROCESSING SYSTEM HAVING THE SAME

(75) Inventors: Tae Chan Kim, Yongin-si (KR); Kwang Hyuk Bae, Seoul (KR); Kyu-Min Kyung, Seoul (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 35 days.

(21) Appl. No.: 13/242,583

(22) Filed: Sep. 23, 2011

(65) Prior Publication Data
US 2012/0140099 A1 Jun. 7, 2012

(30) Foreign Application Priority Data
Dec. 1, 2010 (KR) .................. 10-2010-0121608

(51) Int. Cl.
| H04N 9/083 | (2006.01) |
| H04N 3/14 | (2006.01) |
| H04N 9/04 | (2006.01) |
| H04N 5/335 | (2011.01) |
| H04N 5/235 | (2006.01) |
| G06K 9/32 | (2006.01) |

(52) U.S. Cl.
USPC .......... 348/279; 348/280; 348/61; 348/222.1; 382/300

(58) Field of Classification Search
USPC .................. 348/279, 272, 271, 273, 277, 278
See application file for complete search history.

(56) References Cited

U.S. PATENT DOCUMENTS

| 5,631,703 | A | * | 5/1997 | Hamilton et al. | ............ 348/273 |
| 7,274,393 | B2 | | 9/2007 | Acharya | |
| 7,456,384 | B2 | | 11/2008 | Toda | |
| 7,511,749 | B2 | * | 3/2009 | Gruhlk et al. | ................. 348/272 |
| 2004/0174446 | A1 | * | 9/2004 | Acharya | ........................ 348/279 |
| 2010/0289885 | A1 | * | 11/2010 | Lu et al. | ......................... 348/61 |
| 2011/0013056 | A1 | * | 1/2011 | Myhrvold | ..................... 348/279 |
| 2011/0249157 | A1 | * | 10/2011 | Fredembach et al. | ........ 348/273 |
| 2011/0249159 | A1 | * | 10/2011 | Fukunaga | ..................... 348/279 |
| 2011/0310277 | A1 | * | 12/2011 | Imamura et al. | ............. 348/279 |

FOREIGN PATENT DOCUMENTS

| JP | 2006-190958 | 7/2006 |
| KR | 10-2006-0065551 | 6/2006 |
| KR | 10-2010-0045204 | 5/2010 |

* cited by examiner

*Primary Examiner* — Twyler Haskins
*Assistant Examiner* — Padma Haliyur
(74) *Attorney, Agent, or Firm* — Stanzione & Kim, LLP

(57) ABSTRACT

A color filter array of an image sensor is disclosed. The color filter array includes a first filter to transmit wavelengths of a first region in a visible light region, a second filter to transmit wavelengths of a second region in the visible light region, a third filter to transmit wavelengths of a third region in the visible light region, and a mixed filter to transmit wavelengths of at least one of the first region, the second region and the third region, and wavelengths of an infrared region at the same time.

19 Claims, 16 Drawing Sheets

FIG. 1

| GF | RF | GF | RF | GF | RF | GF | RF | GF | RF | GF | RF |
|----|----|----|----|----|----|----|----|----|----|----|----|
| BF | MxF | BF | MxF | BF | MxF | BF | MxF | BF | MxF | BF | MxF |
| GF | RF | GF | RF | GF | RF | GF | RF | GF | RF | GF | RF |
| BF | MxF | BF | MxF | BF | MxF | BF | MxF | BF | MxF | BF | MxF |
| GF | RF | GF | RF | GF | RF | GF | RF | GF | RF | GF | RF |
| BF | MxF | BF | MxF | BF | MxF | BF | MxF | BF | MxF | BF | MxF |
| GF | RF | GF | RF | GF | RF | GF | RF | GF | RF | GF | RF |
| BF | MxF | BF | MxF | BF | MxF | BF | MxF | BF | MxF | BF | MxF |
| GF | RF | GF | RF | GF | RF | GF | RF | GF | RF | GF | RF |
| BF | MxF | BF | MxF | BF | MxF | BF | MxF | BF | MxF | BF | MxF |
| GF | RF | GF | RF | GF | RF | GF | RF | GF | RF | GF | RF |
| BF | MxF | BF | MxF | BF | MxF | BF | MxF | BF | MxF | BF | MxF |

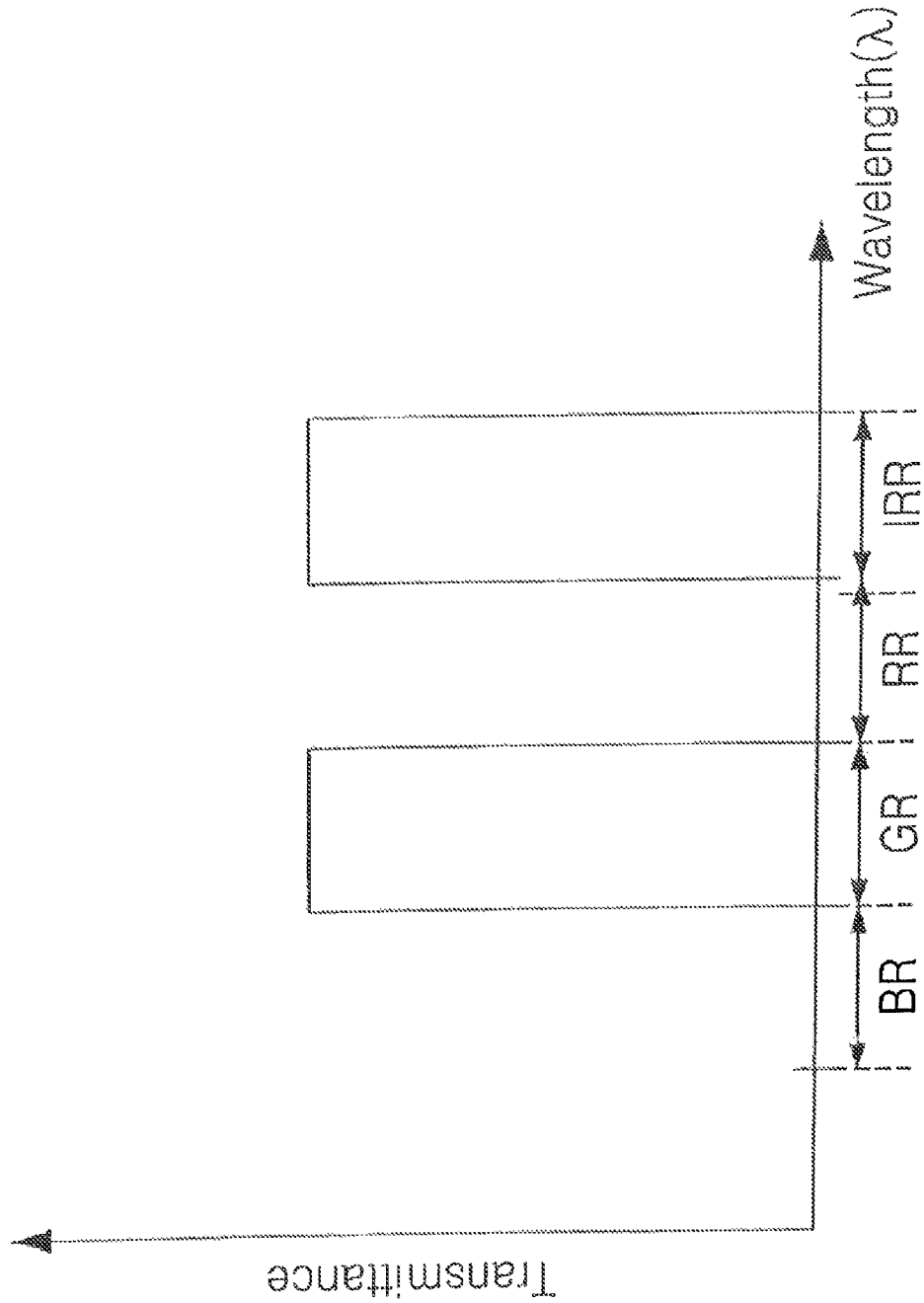

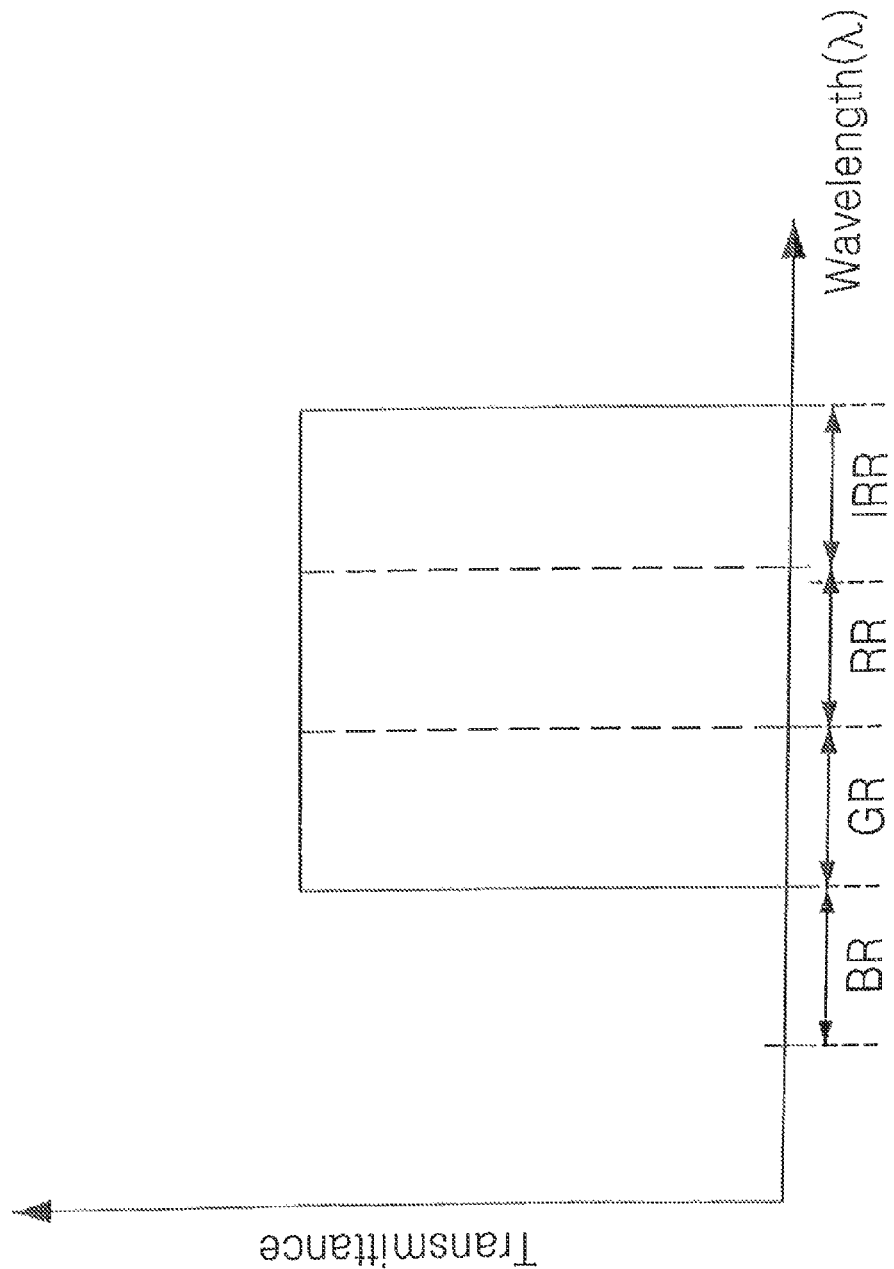

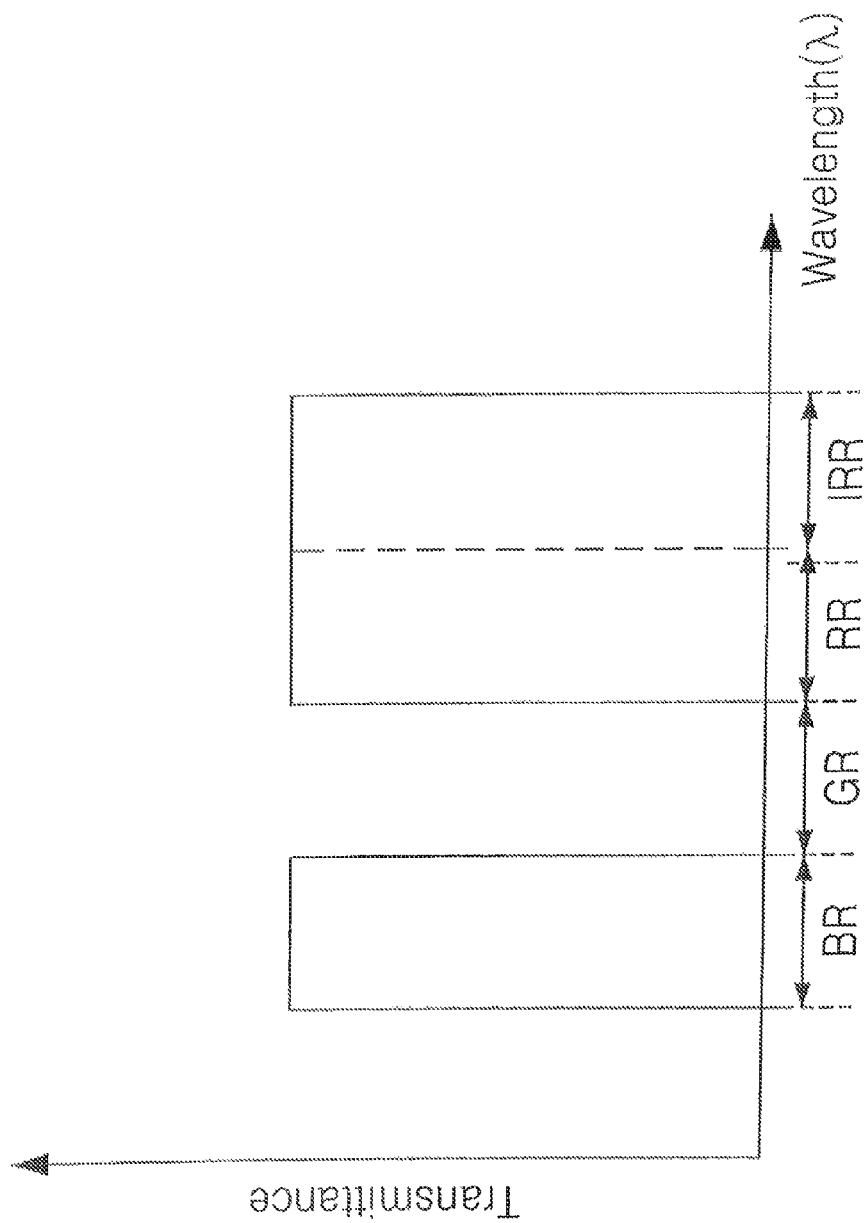

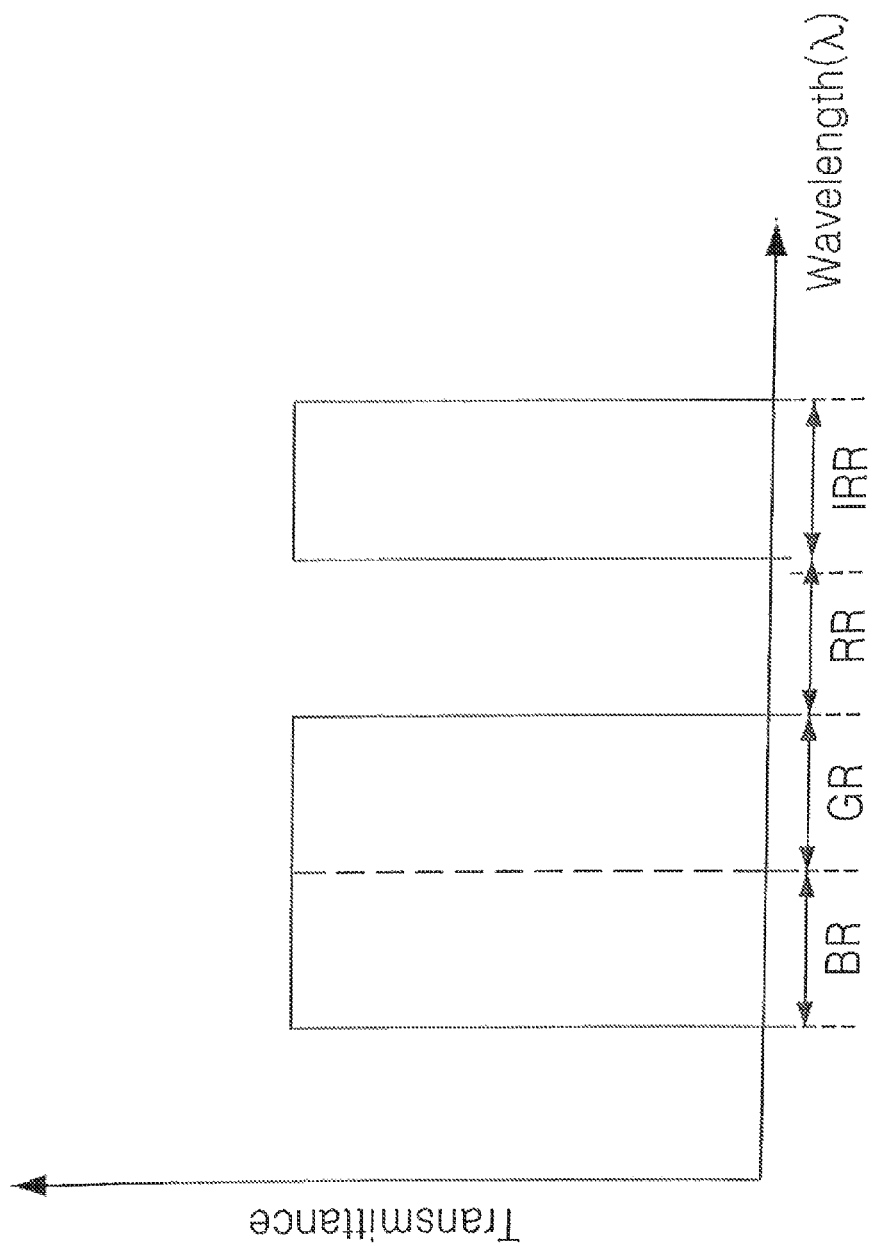

| WF | RF |
|----|-----|
| GF | MxF |

| WF | RF |
|----|-----|
| BF | MxF |

| WF | GF |
|----|-----|
| BF | MxF |

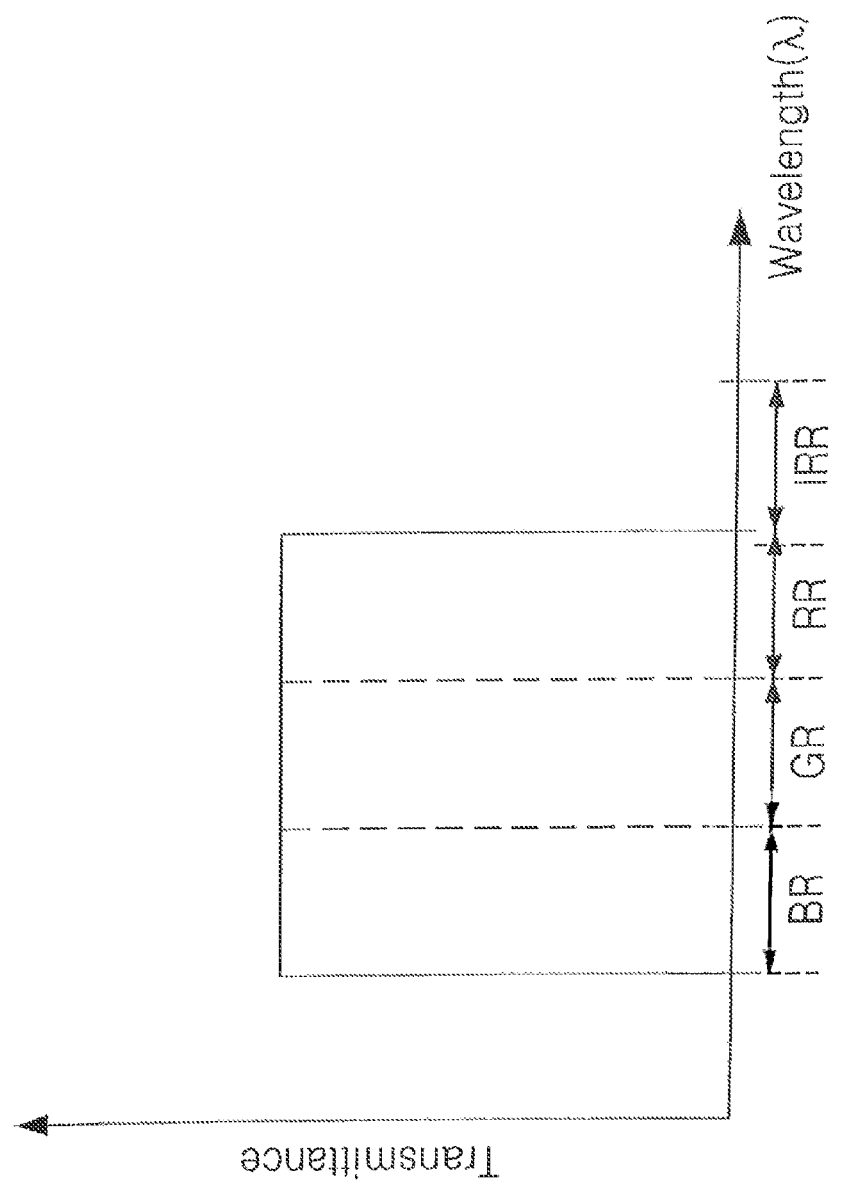

COLOR FILTER ARRAY, IMAGE SENSOR HAVING THE SAME, AND IMAGE PROCESSING SYSTEM HAVING THE SAME

CROSS-REFERENCE TO RELATED APPLICATIONS

This application claims priority under 35 U.S.C. §119(a) from Korean Patent Application No. 10-2010-0121608 filed on Dec. 1, 2010, the disclosure of which is hereby incorporated by reference in its entirety.

BACKGROUND OF THE INVENTION

1. Field of the Invention

Example embodiments of the present general inventive concept relate to a color filter array, and more particularly, to a color filter array included in an image sensor to detect color image information and depth information of an object at the same time, the image sensor including the filter array, and an image processing system including the image sensor.

2. Description of the Related Art

The color filter array included in the image sensor includes color filters for transmitting corresponding wavelengths in a visible light region in order to capture color image information (or color information) of an object and infrared filters for transmitting corresponding wavelengths in order to capture depth information of the object.

In a conventional camera structure to receive depth information and color information at the same time, a lens and a sensor to receive depth information, and a lens and a sensor to receive color information need to be included in a single camera, which results in high price of the camera and having a difficulty of synchronization between the two sensors.

SUMMARY OF THE INVENTION

Exemplary embodiments of the present general inventive concept provide a color filter array to detect color information and depth information at the same time, so as to adjust and process the both information correctly, thereby improving reliability of the depth information, an image sensor including the same, and an image processing system including the image sensor.

Additional features and utilities of the present general inventive concept will be set forth in part in the description which follows and, in part, will be obvious from the description, or may be learned by practice of the general inventive concept.

Exemplary embodiments of the present general inventive concept provide a color filter array of an image sensor including a first filter to transmit wavelengths of a first region in a visible light region, a second filter to transmit wavelengths of a second region in the visible light region, a third filter to transmit wavelengths of a third region in the visible light region, and a mixed filter to transmit wavelengths of at least one region of the first region to third region and wavelength of infrared region at the same time.

The first filter of the color filter array may be a red filter to transmit wavelengths of a red region, the second filter may be a green filter to transmit wavelengths of a green region, and the third filter may be a blue filter to transmit wavelengths of a blue region.

The mixed filter may transmit the wavelengths of the red region and the wavelengths of the infrared region at the same time.

The mixed filter may transmit the wavelengths of the green region and the wavelengths of the infrared region at the same time.

The mixed filter may transmit the wavelengths of the blue region and the wavelengths of the infrared region at the same time.

The mixed filter may transmit the wavelengths of the red region, the wavelengths of the green region, and the wavelengths of the infrared region at the same time.

The mixed filter may transmit the wavelengths of the red region, the wavelengths of the blue region, and the wavelengths of the infrared region at the same time.

The mixed filter may transmit the wavelengths of the green region, the wavelengths of the blue region, and the wavelengths of the infrared region at the same time.

The mixed filter may transmit the wavelengths of the red region, the wavelengths of the green region, the wavelengths of the blue region, and the wavelengths of the infrared region at the same time.

Exemplary embodiments of the present general inventive concept may also provide a color filter array of an image sensor including the first filter that may be a cyan filter to transmit wavelengths of cyan region, the second filter that may be a yellow filter to transmit wavelengths of a yellow region, and the third filter that may be a magenta filter to transmit wavelengths of a magenta region.

Exemplary embodiments of the present general inventive concept may also provide a color filter array of an image sensor including a white filter to transmit wavelengths of a visible light region, a mixed filter to transmit wavelengths of the visible light region and wavelengths of an infrared region at the same time, and two filters among a red filter to transmit wavelengths of a red region in the visible light region, a green filter to transmit wavelengths of a green region in the visible light region, and a blue filter to transmit wavelengths of a blue region in the visible light region.

According to example embodiments of the present general inventive concept, an image sensor can include the color filter array and a plurality of photoelectric conversion elements, each being disposed adjacent to one side of the color filter array.

The first filter of the image sensor may be a red filter to transmit wavelengths of a red region, the second filter may be a green filter to transmit wavelengths of a green region, and the third filter may be a blue filter to transmit wavelengths of a blue region.

According to example embodiments of the present general inventive concept, an image processing system can include the image sensor and a processor to control an operation of the image sensor.

The first filter of the image processing system may be a red filter to transmit wavelengths of a red region, the second filter may be a green filter to transmit wavelengths of a green region, and the third filter may be a blue filter to transmit wavelengths of a blue region.

The processor may generate depth information by using a difference between information of wavelengths that have passed through the mixed filter and information of wavelengths that have passed through at least one of the red filter, the green filter, and the blue filter configured to transmit wavelengths of a visible region, which was transmitted by the mixed filter.

The processor may generate depth information by using a difference between information of wavelengths that have passed through the mixed filter and information of wavelengths that have passed through the white filter.

The processor may generate information of the wavelengths that have pass through a filter which is not included in the color filter array, among the red filter, the green filter, and the blue filter by using a difference between information of wavelengths that have passed through the white filter and information of wavelengths that have passed through two filters which are included in the color filter array, among the red filter, the green filter and the blue filter.

Exemplary embodiments of the present general inventive concept may also provide a pixel array, including a first filter to transmit wavelengths of a first region in a visible light region, a second filter to transmit wavelengths of a second region in the visible light region, a third filter to transmit wavelengths of a third region in the visible light region, a mixed filter to transmit wavelengths of at least one of the first region, the second region, and the third region, and at least one photoelectric conversion unit to output signals corresponding to the wavelengths of the first region, the second region, and the third region transmitted by the first filter, the second filter, the third filter, and the mixed filter.

The pixel array may include where the first filter is a red filter to transmit wavelengths of a red region, the second filter is a green filter to transmit wavelengths of a green region, and the third filter is a blue filter to transmit wavelengths of a blue region.

The pixel array may include where the first filter is a cyan filter to transmit wavelengths of a cyan region, the second filter is a yellow filter to transmit wavelengths of a yellow region, and the third filter is a magenta filter to transmit wavelengths of a magenta region.

The pixel array may include wherein the mixed filter transmits wavelengths of at least one of a red region, a green region, and a blue region, and the at least one photoelectric conversion unit output signals corresponding to the infrared region transmitted by the mixed filter.

The pixel array may include where the mixed filter transmits wavelengths of an infrared region, and the at least one photoelectric conversion unit outputs signals corresponding to the infrared region transmitted by the mixed filter.

The pixel array may include where at least one of the first filter, the second filter, and the third filter is a white filter to transmit wavelengths of a visible light region.

Exemplary embodiments of the present general inventive concept may also include a pixel array, having a first pixel array unit including a first pixel element having a first filter to transmit wavelengths of a first region and a first photoelectric conversion unit so as to output a first pixel signal corresponding to the wavelengths of the green region that pass through the first filter, and a second pixel element having a second filter to transmit wavelengths of a second region and a second photoelectric conversion unit so as to output a second pixel signal corresponding to the wavelengths of the second region that pass through the second filter, and a second pixel array unit including a third pixel element having a third filter to transmit wavelengths of a third region and a third photoelectric conversion unit so as to output a third pixel signal corresponding to the wavelengths of the blue region that pass through the third filter, and a mixed pixel element having a fourth filter to transmit wavelengths of a predetermine region and a fourth photoelectric conversion unit so as to output a mixed pixel signal corresponding to the wavelengths of at least one of the first region, the second region, and the third region that pass through the fourth filter.

The pixel array may further include a white pixel unit that includes a white filter to transmit wavelengths of visible light and a fifth photoelectric conversion unit so as to output a white pixel signal corresponding to the visible wavelengths that pass through the white filter.

The pixel array may include where the first filter is a green filter and the first region is a green region, the second filter is a red filter and the second region is a red region, and the third region is a blue filter and the third region is a blue region.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 1 illustrates a plan view of a color filter array according to exemplary embodiments of the present general inventive concept;

FIGS. 2A through 4 illustrate transmittance of a mixed filter illustrated in FIG. 1 according to wavelengths;

FIGS. 5A through 5C are plan views illustrating exemplary embodiments of unit filter arrays included in the color filter array illustrated in FIG. 1 according to exemplary embodiments of the present general inventive concept;

FIG. 6 illustrates transmittance of a white filter illustrated in FIGS. 5A through 5C according to wavelengths;

DETAILED DESCRIPTION OF THE PREFERRED EMBODIMENTS

Figure 2A:
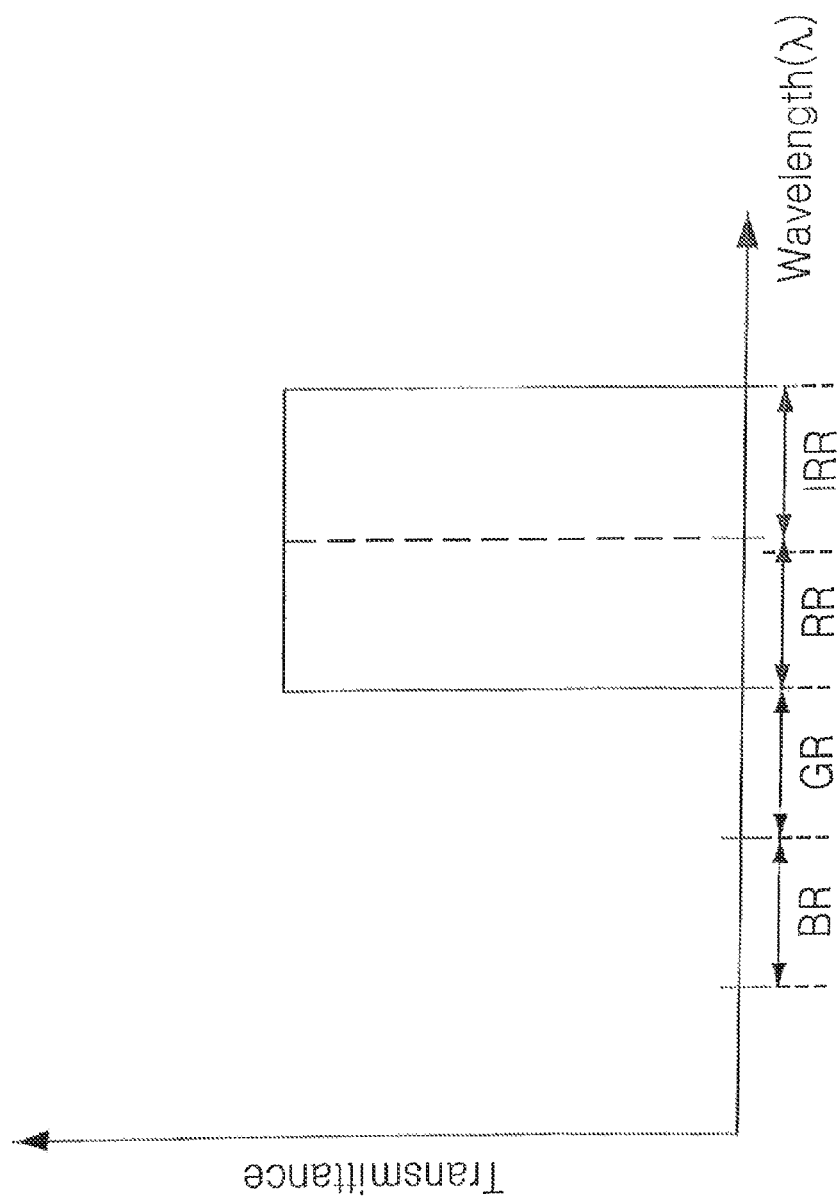

Exemplary embodiments now will be described more fully hereinafter with reference to the accompanying drawings. The exemplary embodiments may, however, be embodied in many different forms and should not be construed as limited to the embodiments set forth herein. Rather, these embodiments are provided so that this disclosure will be thorough and complete. In the drawings, the size and relative sizes of layers and regions may be exaggerated for clarity. Like numbers refer to like elements throughout. The embodiments are described below in order to explain the present general inventive concept while referring to the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 illustrates a plan view of a color filter array according to exemplary embodiments of the present general inventive concept. Referring to FIG. 1, the color filter array 10 can include a plurality of color filters RFs, GFs, and BFs, and a plurality of mixed filters MxFs. The mixed filter MxF, as discussed in detail below, may transmit a particular wavelength or band of wavelengths. The color filter array 10 illustrated in FIG. 1 can be an m×n (m and n are natural numbers, for example, m=12 and m=16) matrix, but the color filter array 10 according to the present general inventive concept is not restricted to this embodiment. According to exemplary embodiments, the color filter array 10 may be matrixes of various sizes.

The color filter array 10 may include a plurality of a first unit filter arrays 20 which may be a 2×2 matrix. The first unit filter array 20 includes a red filter RF, a green filter GF, a blue filter BF, and a mixed filter MxF.

The red filter RF is a filter to transmit wavelengths corresponding to a red region in a visible light region. The green filter GF is a filter to transmit wavelengths corresponding to a green region in a visible region. The blue filter BF is a filter to transmit wavelengths corresponding to a blue region in a visible light region.

FIGS. 2A through 4 illustrate transmittance of the mixed filter MxF according to wavelengths. The mixed filter MxF may have various passbands (e.g., particular wavelengths or ranges of wavelengths may be transmitted, while other wavelengths or ranges of wavelengths may be reflected, blocked, and/or absorbed by the mixed filter MxF). Referring to FIG. 2A, the mixed filter MxF may transmit wavelengths corresponding to a red region RR in a visible light region and an infrared region IRR. Referring to FIG. 2B, the mixed filter MxF may transmit wavelengths corresponding to a green region GR in the visible light region and an infrared region IRR. Referring to FIG. 2C, the mixed filter MxF may transmit wavelengths corresponding to a blue region BR in the visible region and an infrared region IRR.

Referring to FIG. 3A, the mixed filter MxF may transmit wavelengths corresponding to a green region GR, a red region RR, and an infrared region IRR. Referring to FIG. 3B, the mixed filter MxF may transmit wavelengths corresponding to a blue region BR, a red region RR, and an infrared region IRR. Referring to FIG. 3C, the mixed filter MxF may transmit wavelengths corresponding to a blue region BR, a green region GR, and an infrared region IRR.

Figure 4:
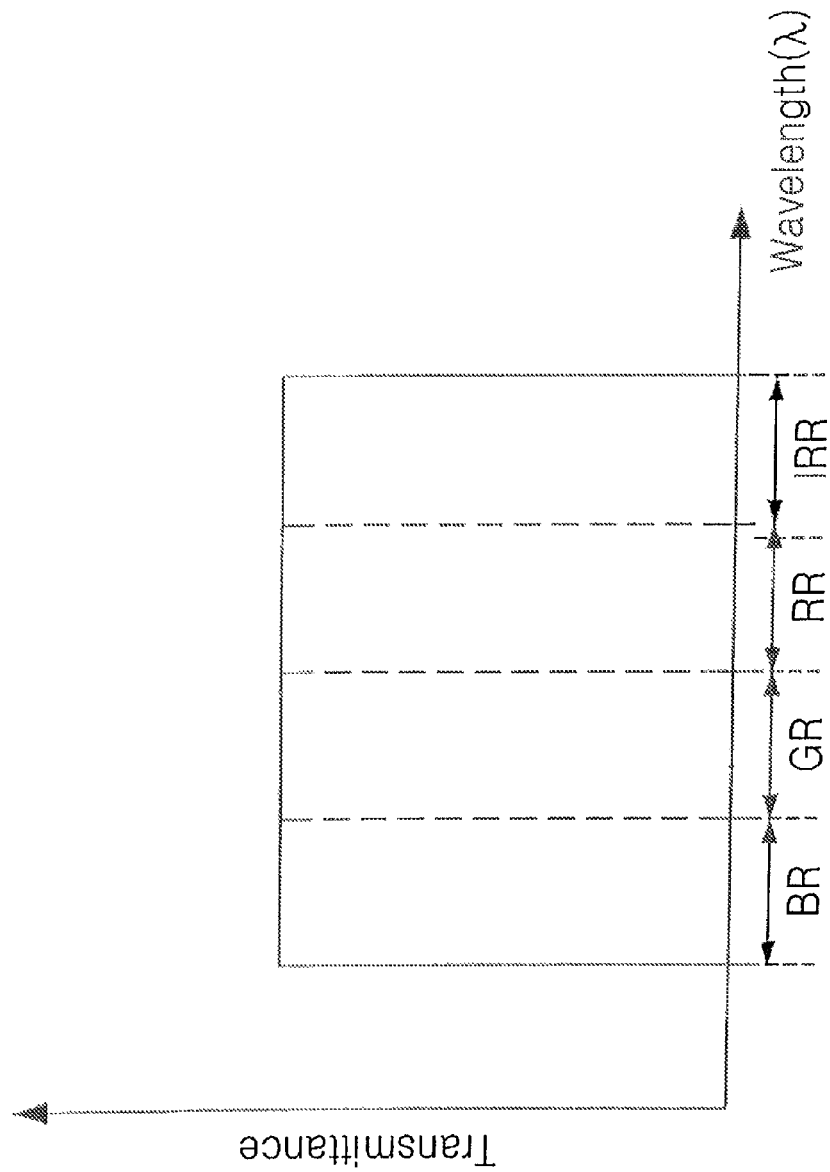

Referring to FIG. 4, the mixed filter MxF may transmit wavelengths corresponding to a blue region BR, a green region GR, a red region RR and an infrared region IRR.

Figure 5A:
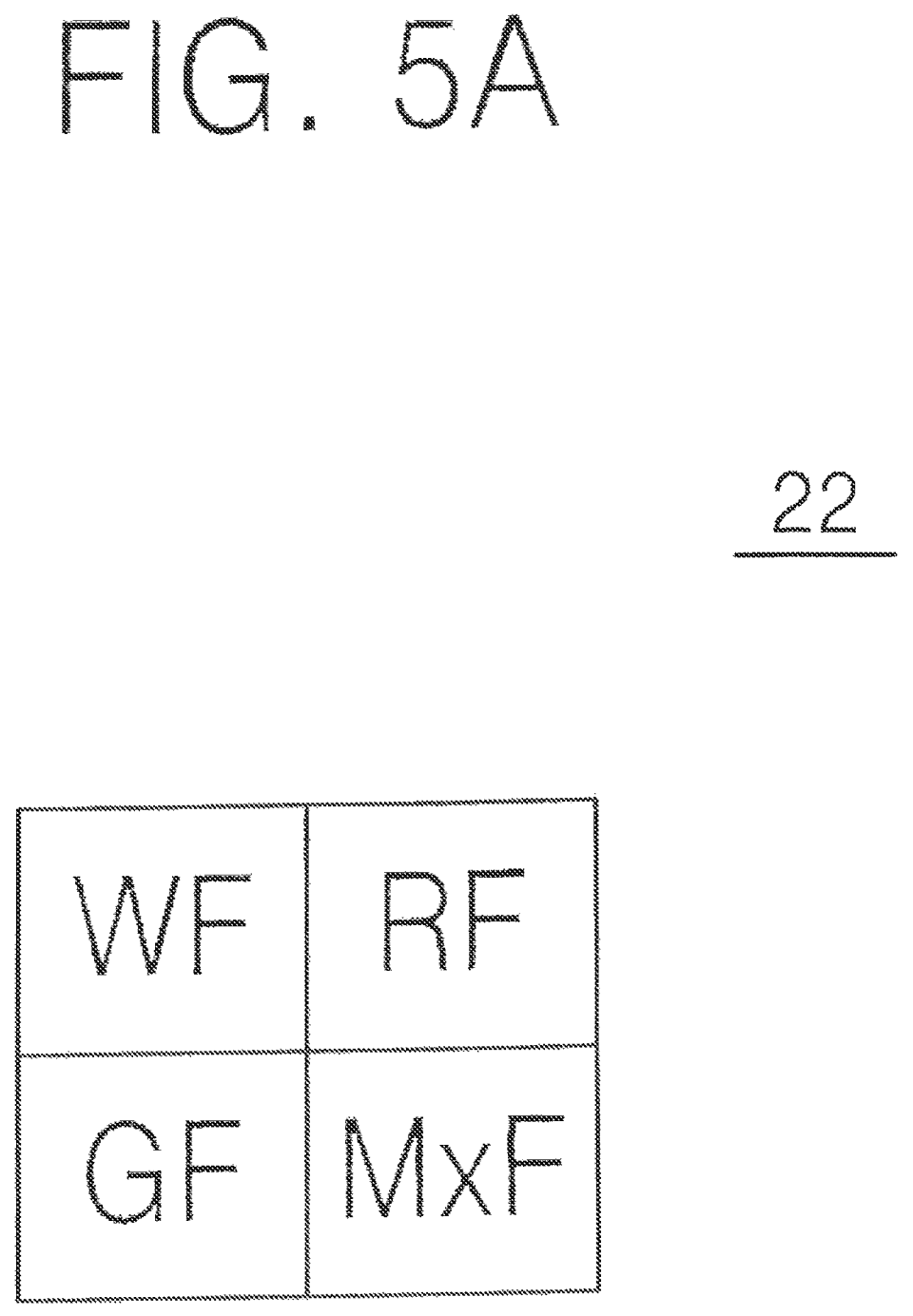
Figure 5B:
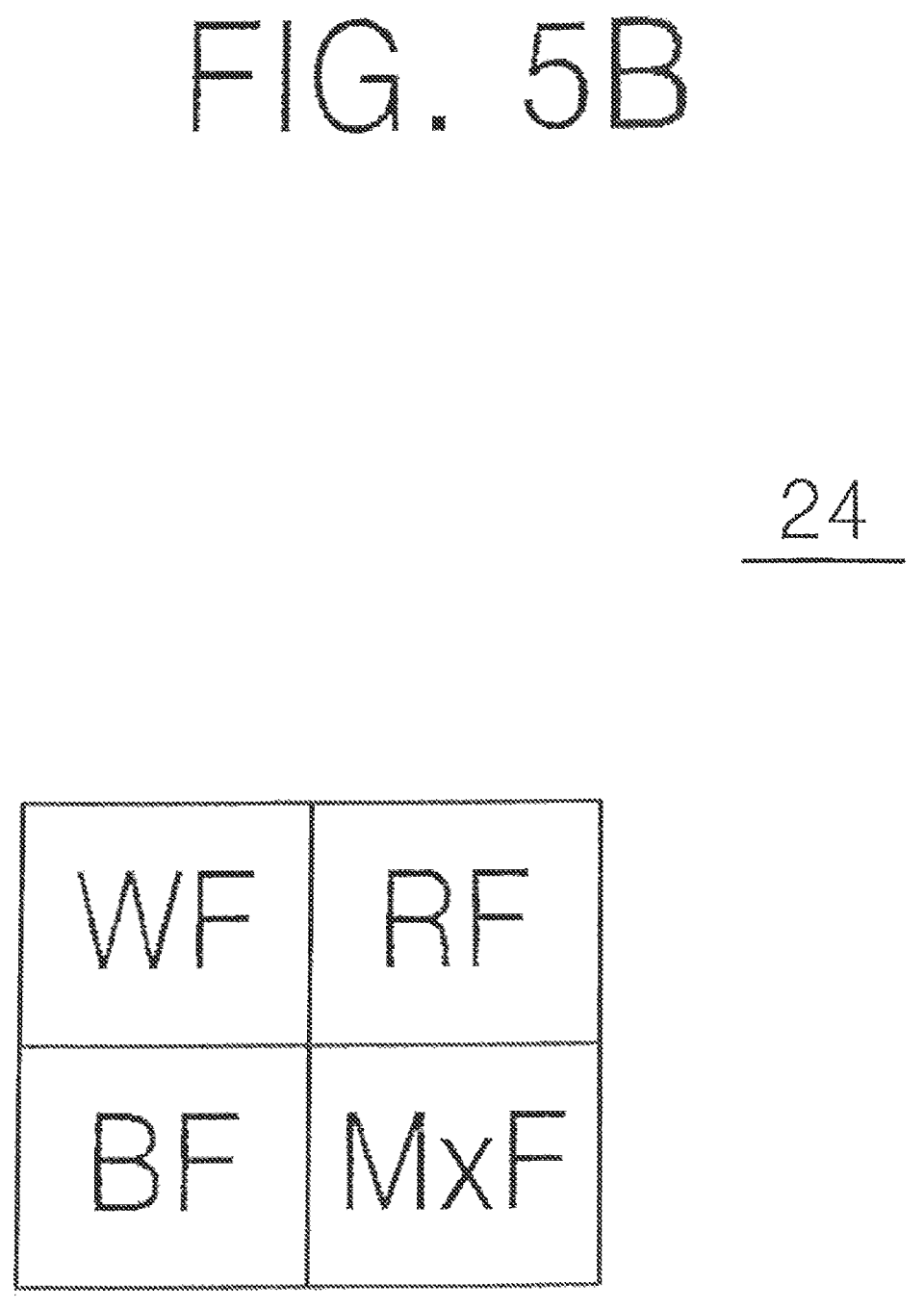
Figure 5C:
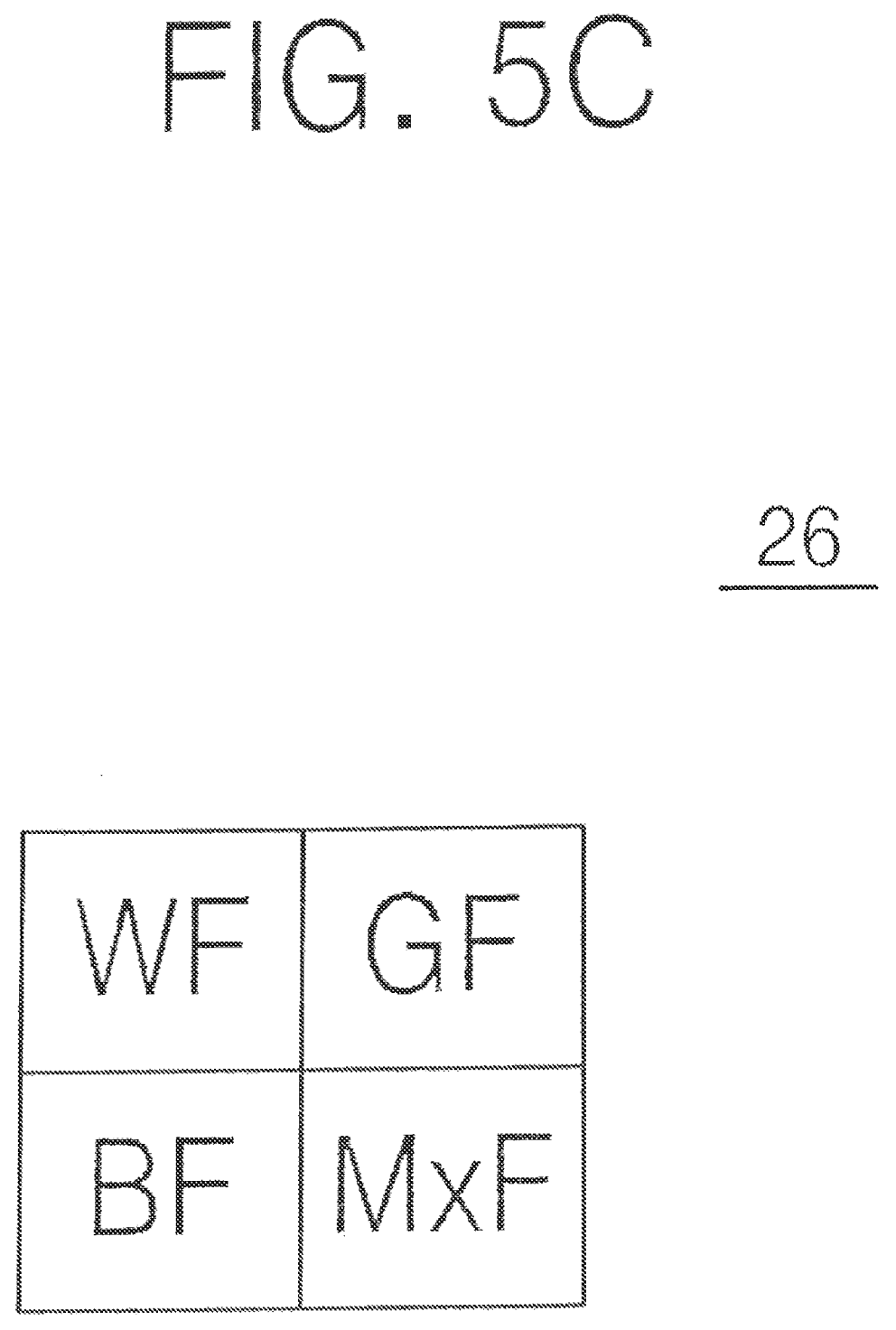

FIG. 5A through 5C illustrate exemplary embodiments of the present general inventive concept of unit filter arrays included in the color filter array illustrated in FIG. 1, and FIG. 6 illustrates transmittance of a white filter WF according to wavelengths. Referring to FIG. 5A, a second unit filter array 22 can include a white filter WF, a red filter RF, a green filter GF, and a mixed filter MxF. As illustrated in FIG. 6, the white filter WF may transmit wavelengths corresponding to a visible light region, that is, a blue region BR, a green region GR, and a red region RR. The mixed filter MxF may transmit wavelengths corresponding to a blue region BR, a green region GR, a red region RR, and an infrared region IRR, as illustrated in FIG. 4.

Referring to FIG. 5B, a third unit filter array 24 can include a white filter WF, a red filter RF, a blue filter BF, and a mixed filter MxF. The mixed filter MxF may transmit wavelengths corresponding to a blue region BR, a green region GR, a red region RR, and an infrared region IFF, as illustrated in FIG. 4.

Referring to FIG. 5C, a fourth unit filter array 26 includes a white filter WF, a green filter GF, a blue filter BF, and a mixed filter MxF. The mixed filter MxF may transmit wavelengths corresponding to a blue region BR, a green region GR, a red region RR, and an infrared region IRR, as illustrated in FIG. 4.

Figure 7A:
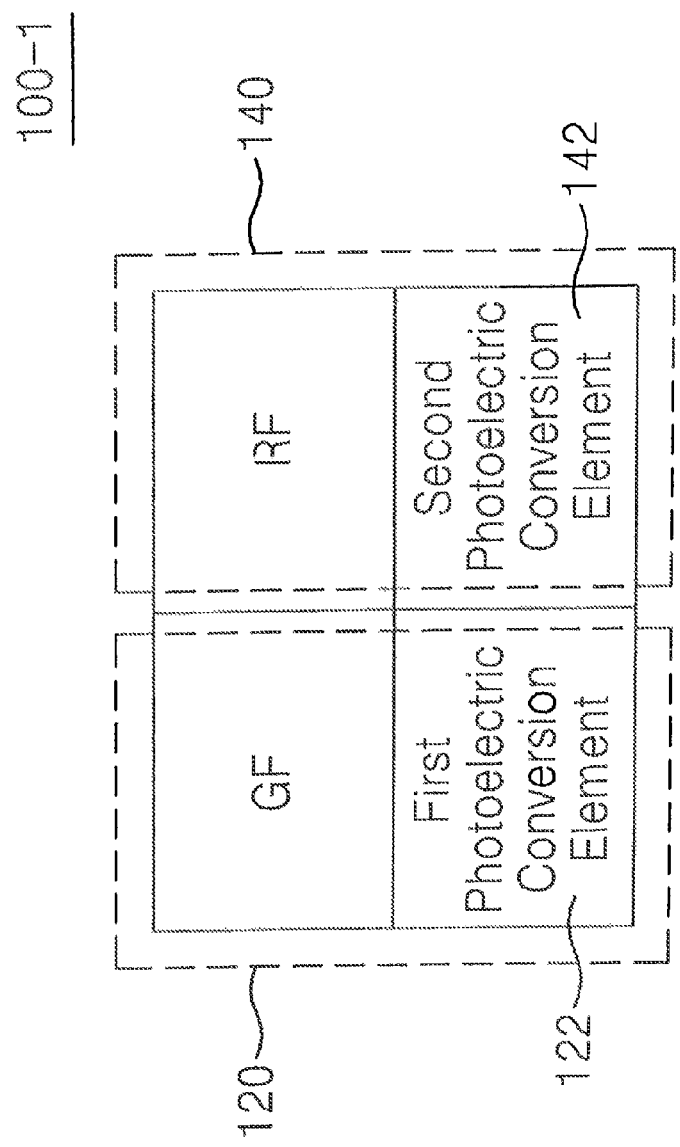
FIGS. 7A and 7B are schematic sectional views illustrating a part of a pixel array including the color filter array illustrated in FIG. 1 according to exemplary embodiments of the present general inventive concept.
Figure 7B:
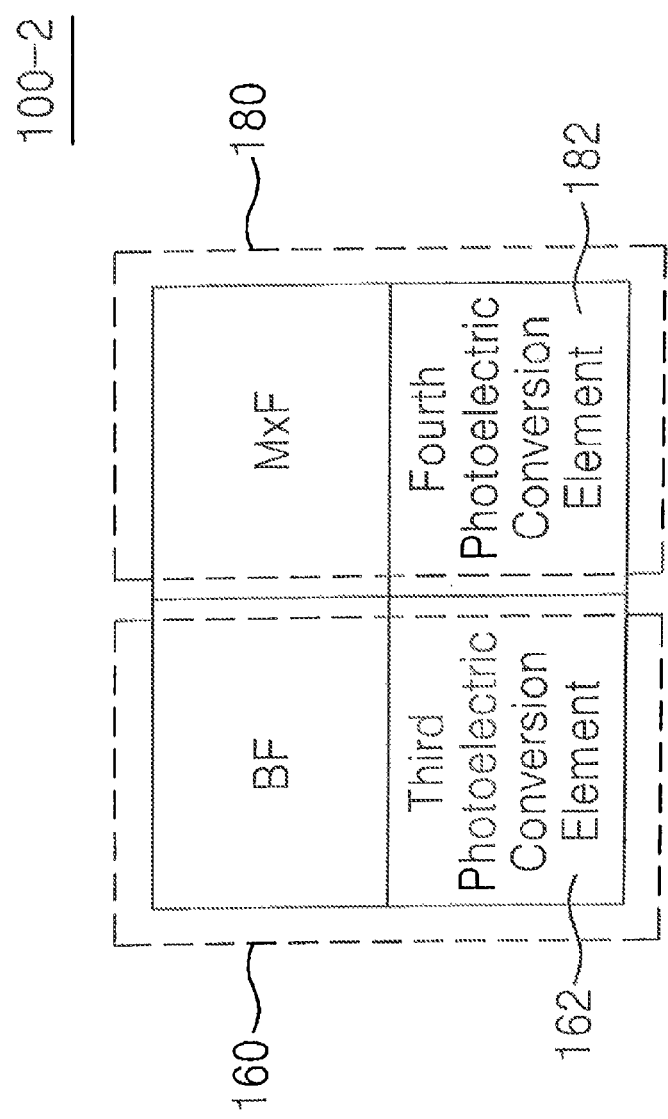

FIGS. 7A and 7B illustrate partial sectional views of pixel arrays including the color filter array illustrated in FIG. 1. FIG. 7A illustrates a pixel array 100-1, and FIG. 7B illustrates a pixel array 100-2. Referring to FIGS. 7A and 7B, the pixel array includes the filter array and photoelectric conversion elements each being deposited under the color filter array.

The pixel array 100-1 illustrated in FIG. 7A includes a green pixel 120 having a green filter GF and a first photoelectric conversion element 122, for example, a first photo diode. The green filter GF can transmit wavelengths of a green region in a visible light region, so that the first photoelectric conversion element 122 generates photo electrons according to wavelengths that have passed through the green filter GF. Accordingly, the green pixel 120 outputs a green pixel signal corresponding to the wavelengths of a green region that passed through the green filter GF.

Still referring to FIG. 7A, a red pixel 140 includes a red filter RF and a second photoelectric conversion element 142, for example, a second photo diode. The red filter RF can transmit wavelengths of a red region in a visible light region, so that the second photoelectric conversion element 142 generates photo electrons according to wavelengths that have passed through the red filter RF. Accordingly, the red pixel 140 outputs a red pixel signal corresponding to the wavelengths of a red region that passed through the red filter RF.

As illustrated in FIG. 7B, a pixel array 100-2 includes a blue pixel 160 having a blue filter BF and a third photoelectric conversion element 162, for example, a third photo diode. The blue filter BF can transmit wavelengths of a blue region in a visible light region, so that the third photoelectric conversion element 162 generates photo electrons according to wavelengths that have passed through the blue filter BF. Accordingly, the blue pixel 160 outputs a blue pixel signal corresponding to the wavelengths of a blue region that passed through the blue filter BF.

The mixed pixel 180 includes a mixed filter MxF and a fourth photoelectric conversion element 182, for example, a fourth photo diode. The mixed filter MxF, as described referring to FIG. 2A through 4, transmits wavelengths of a specific region, so that the fourth photoelectric conversion element 182 generates photo electrons according to wavelengths that have passed the mixed filter MxF. Accordingly, the mixed pixel 180 outputs a mixed pixel signal corresponding to the wavelengths that passed through the mixed filter MxF.

The pixel array may include a white pixel. The white pixel includes a white filter WF and a fifth photoelectric conversion element, for example, a fifth photo diode. The white pixel transmits wavelengths of a visible light region, that is, a red region, a green region, and a blue region, so that the fifth photoelectric conversion element generates photo electrons according to wavelengths that have passed the white filter. Accordingly, the white pixel output a white pixel signal corresponding to the wavelengths of the visible light region that passed through the white filter.

Figure 8:
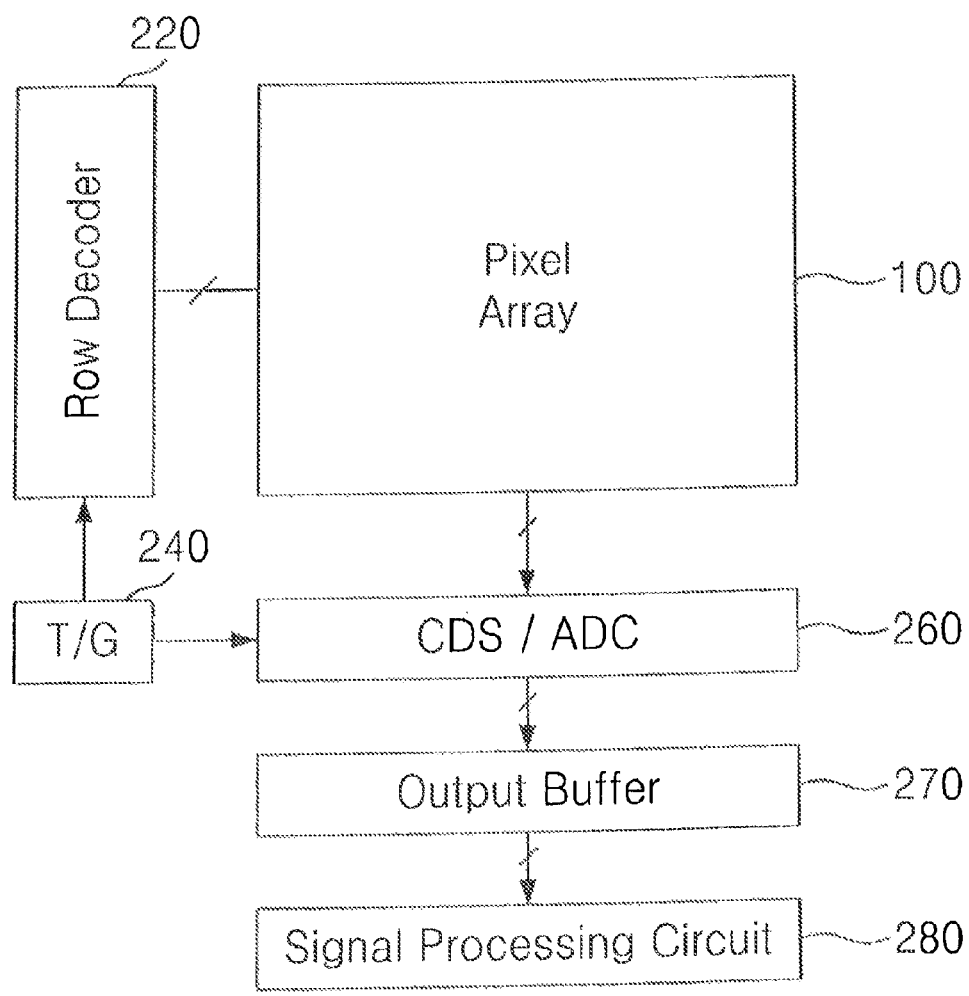
FIG. 8 is a schematic block diagram illustrating an image sensor including the pixel array illustrated in FIGS. 7A and 7B according to exemplary embodiments of the present general inventive concept.

FIG. 8 is a schematic block diagram illustrating an image sensor including the pixel array comprising the color filter array illustrated in FIG. 1 according to exemplary embodiments of the present general inventive concept. Referring to FIG. 8, an image sensor 200 which may be a CMOS (complimentary metal oxide semiconductor) device that includes a pixel array 100 having the color filter array 10 illustrated in FIG. 1, a row decoder 220, a timing generator 240, and correlated double sampling (CDS)/analog-to-digital converter (ADC) circuit 250.

The pixel array 100 can include a plurality of pixels to output RGB color signals (or RGB color information) and a depth signal (or depth information) which are included in incident light. Each of the plurality of pixels of the pixel array 100 outputs pixel signals that correspond to incident light that is input through each filter which is included in each of the pixels.

The row decoder 220 can select a row in a plurality of rows in response to an address and can control signals output from the timing generator 240.

According to the control signals output from the timing generator 240, CDS/ADC circuit 260 can perform correlated double sampling (CDS) with respect to each signal output from the pixel array 100. Each signal that is processed by CDS may be converted from an analog signal to a digital signal with the CDS/ADC circuit 260, which may also output the respective digital signals. Each of the digital signals may be the signals corresponding to the strength (e.g., intensity, magnitude, and/or optical power) of the wavelengths that passed through filters corresponding to each of the digital signals.

The image sensor 200 may include an output buffer 270 and a signal processing circuit 280. The signal processing circuit 280 may be a part of a processor of an image processing system.

The output buffer 270 may be a plurality of buffers in which digital signals output from the CDS/ADC circuit 260 are stored. The output buffer 270 may output the digital signals into the signal processing circuit 280. In some exemplary embodiments of the present general inventive concept, the output buffer 270 may be omitted.

The signal processing circuit 280 can generate RGB color information and depth information based on pixel signals or the digital signals. Hereinafter, a method of the generating the color information and the depth information with, for example, the signal processing circuit 280, will be described. The color information and the depth information may be generated with the unit filter array as a basic unit.

When the mixed filter of the color filter array illustrated in FIG. 1 has a transmittance as illustrated in FIG. 2A, depth information may be determined by Equation 1.

$$DV = MxV - RV \quad \text{[Equation 1]}$$

In Equation 1, MxV denotes a signal by wavelengths that have passed a mixed filter and RV denotes a signal by wavelengths that have passed a red filter. In some exemplary embodiments of the present general inventive concept, the MxV and the RV may denote digital signals output from CDS/ADC circuit 260.

When DV denotes a depth signal by wavelengths corresponding to an infrared region, the depth signal DV is determined by subtracting a signal by wavelengths corresponding to the region except for the infrared region from a signal by wavelengths that have passed through the mixed filter. That is, the depth signal DV is a signal of MxV minus RV. Accordingly, the signal processing circuit 280 or an exterior signal processor may obtain depth information by using the depth signal, that is, DV.

When the mixed filter illustrated in FIG. 1 has transmittance as illustrated in FIG. 2B, depth information may be obtained by Equation 2.

$$DV = MxV - GV \quad \text{[Equation 2]}$$

In Equation 2, MxV denotes a signal by wavelengths that have passed through a mixed filter and GV denotes a signal by wavelengths that have passed a green filter. In exemplary embodiments of the present general inventive concept, the MxV and the GV may denote digital signals output from CDS/ADC circuit 260.

When DV denotes a depth signal by wavelengths corresponding to an infrared region, the depth signal DV is a signal of MxV minus GV. Accordingly, the signal processing circuit 280 or an exterior signal processor may determine depth information by using the depth signal, that is, DV.

Figure 2C:
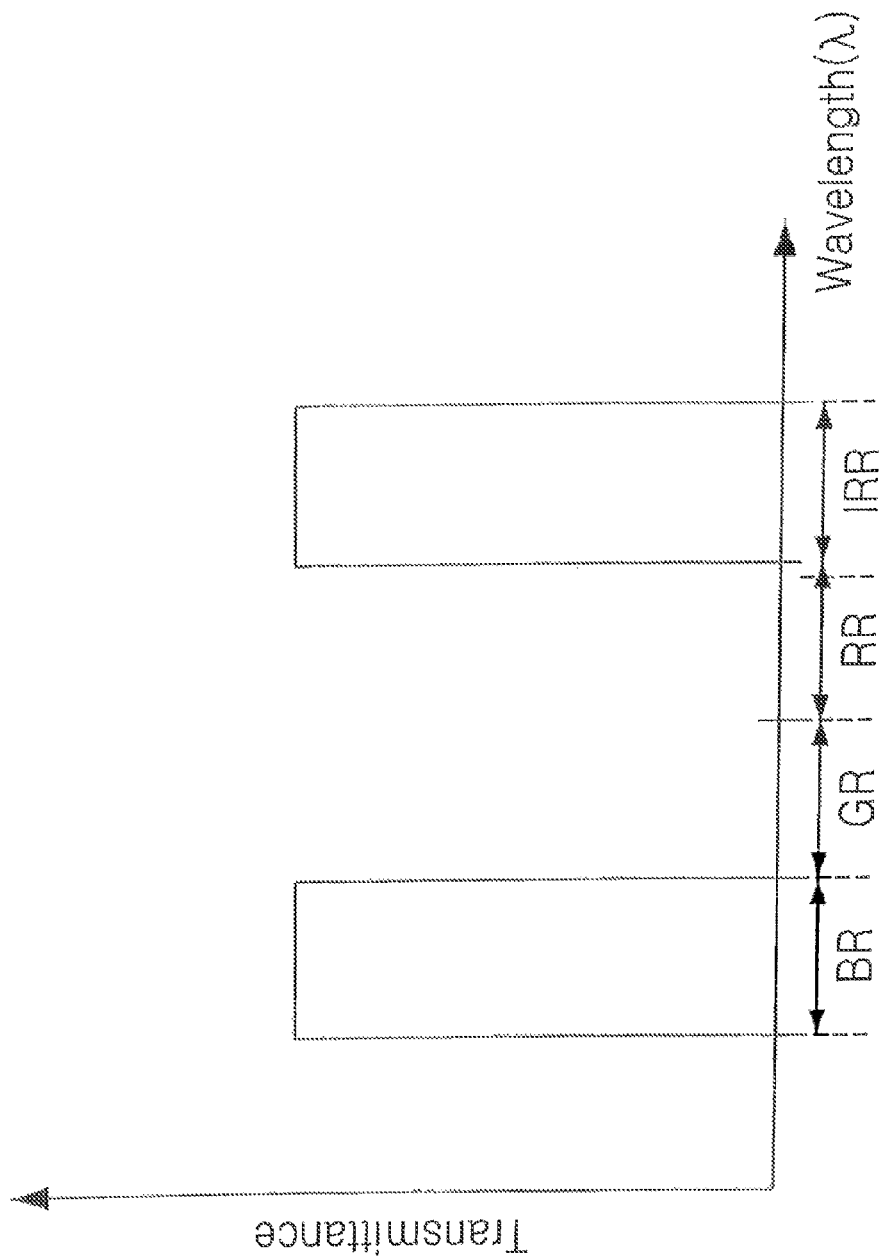

When the mixed filter illustrated in FIG. 1 has transmittance as illustrated in FIG. 2C, the method of determining the depth information is similar to the above-described method, therefore, descriptions thereof will be omitted.

When the mixed filter illustrated in FIG. 1 has transmittance as illustrated in FIG. 3A, depth information may be determined by Equation 3.

$$DV = MxV - RV - GV \quad \text{[Equation 3]}$$

In Equation 3, MxV denotes a signal by wavelengths that have passed through a mixed filter, RV denotes a signal by wavelengths that have passed a red filter, and GV denotes a signal by wavelengths that have passed a green filter. In some exemplary embodiments of the present general inventive concept, the MxV, RV, and GV may denote digital signals output from CDS/ADC circuit 260.

When DV denotes a depth signal by wavelengths corresponding to an infrared region, the depth signal DV can be determined by subtracting a signal by wavelengths corresponding to regions except for the infrared region from a signal by wavelengths that have passed through the mixed filter. That is, the depth signal DV is a signal of MxV minus RV and GV. Accordingly, the signal processing circuit 280 or an exterior signal processor may obtain depth information by using the depth signal, that is, DV.

As the mixed filter illustrated in FIG. 1 may have a transmittance as illustrated in FIG. 3B or 3C, the method of determining depth information is similar to the above-described process, and therefore, descriptions thereof will be omitted.

When the mixed filter illustrated in FIG. 1 has transmittance as illustrated in FIG. 4, depth information may be obtained by Equation 4.

$$DV = MxV - RV - GV - BV \quad \text{[Equation 4]}$$

In Equation 4, MxV denotes a signal by wavelengths that have passed through a mixed filter, RV denotes a signal by wavelengths that have passed a red filter, GV denotes a signal by wavelengths that have passed a green filter, and BV denotes a signal by wavelengths that have passed a blue filter. In some embodiments, the MxV, the RV, the GV, and the BV may denote digital signals output from CDS/ADC circuit 260.

When DV denotes a depth signal by wavelengths corresponding to an infrared region, the depth signal DV can be determined by subtracting a signal by wavelengths corresponding to regions except for the infrared region from a signal by wavelengths that have passed through the mixed filter. That is, the depth signal DV is a signal of MxV minus RV, GV and BV. Accordingly, the signal processing circuit 280 or an exterior signal processor may determine depth information by using the depth signal, that is, DV.

When the mixed filter illustrated in FIG. 1 includes the unit filter array illustrated in FIG. 5A and the mixed filter has transmittance as illustrated in FIG. 4, depth information may be determined by Equation 5.

$$DV = MxV - WV \quad \text{[Equation 5]}$$

In Equation 5, MxV denotes a signal by wavelengths that have passed through a mixed filter and WV denotes a signal by wavelengths that have passed a white filter. In some exemplary embodiments of the present general inventive concept, the MxV, and the WV may denote digital signals output from CDS/ADC circuit 260.

When DV denotes a depth signal by wavelengths corresponding to an infrared region, the depth signal DV can be determined by subtracting a signal by wavelengths that have passed through a white filter from MxV. That is, the depth signal DV is a signal of MxV minus WV, as Equation 5. Accordingly, the signal processing circuit 280 or an exterior signal processor may determine depth information by using the depth signal, that is, DV.

At this time, a blue signal by wavelengths in a blue region may be determined by Equation 6.

$$BV = WV - RV - GV \quad \text{[Equation 6]}$$

In Equation 6, RV denotes a signal by wavelengths that have passed through a red filter and GV denotes a signal by wavelengths that have passed through a green filter. In some exemplary embodiments of the present general inventive concept, the RV and the GV may denote digital signals output from CDS/ADC circuit.

When BV denotes a blue signal by wavelengths corresponding to a blue region, the blue signal BV can be determined by subtracting a signal by wavelengths that have passed through a red filter and a signal by wavelengths that have passed through a green filter from WV. That is, the blue signal BV is a signal of WV minus RV and GV, as Equation 6.

When the mixed filter illustrated in FIG. 1 includes the unit filter array as illustrated in FIG. 5B or 5C, the method of determining depth information and color information is similar to the above-described process, therefore, descriptions thereof will be omitted.

Figure 9:
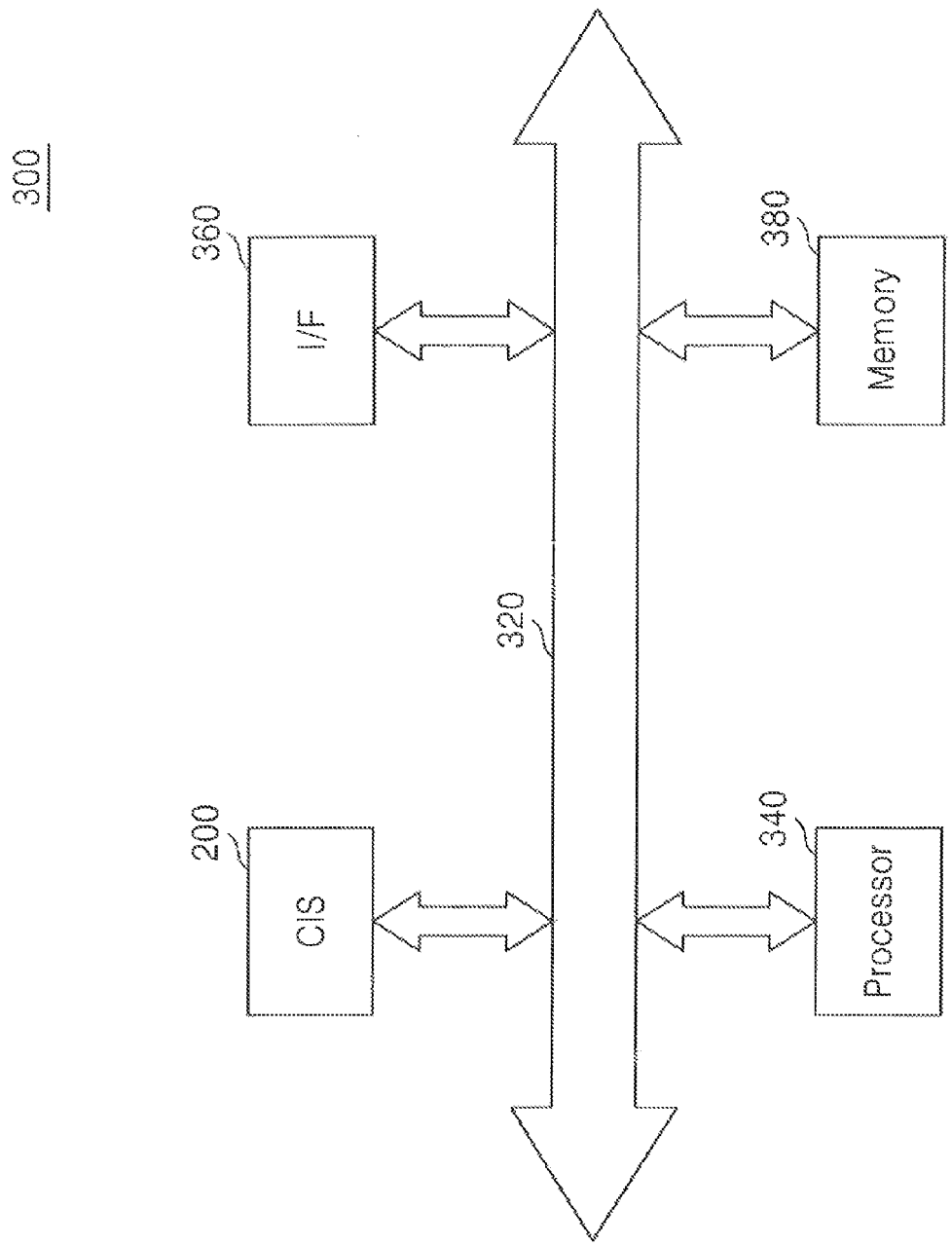
FIG. 9 is a block diagram illustrating an image processing system including the image sensor illustrated in FIG. 8 according to exemplary embodiments of the present general inventive concept.

FIG. 9 is a block diagram illustrating an image processing system 300 including the image sensor 200 illustrated in FIG. 8. The image processing system 300 may include a data bus 320 to communicatively couple the image sensor 200, a processor 340, an interface 360, and a memory 380 together so that data and/or commands can be exchanged between the image sensor 200, the processor 340, the interface 360, and the memory 380.

The image processing system 300 may be a digital camera, mobile phone with a built-in digital camera, and any other electronic device that may include a digital camera, such as a laptop computer, tablet computer, and a display device.

The image processing system 300 may process two-dimensional image information or three-dimensional image information. The image processing system 300 may include the image sensor 200 (as illustrated in FIG. 8 and described in detail above) according to exemplary embodiments of the present general inventive concept.

The image processing system 300 may include the image sensor 200 and a processor 340 to control an operation of the image sensor 200. The processor 340 may color correct, image sharpen, and/or reduce image blur of an image captured by the image sensor 200. The image processing system may include an interface 360. The interface 360 may be an image display unit to display, for example, an image and/or video captured by the image sensor, an image and/or video stored in memory 380, and/or an image processed by processor 340. The interface 360 may be an input/output unit to receive commands from a user or another electronic device that is communicatively coupled to the image processing system 300. The image display unit of the interface 360 may include and/or be communicatively coupled to a memory device 380 to store a still image or a video captured by the image sensor 200 that is controlled by the processor 340. The interface 360 may communicatively couple a storage device such as a memory card, a hard disk drive, and/or a solid state drive to the image processing system so as to store images and/or video captured by the image sensor 200. The interface 360 may include a wired and/or wireless communication interface so that the image processing system 300 may communicate with electronic devices that are communicatively coupled to a wired and/or wireless communications network.

The memory device 380 may be a non-volatile memory device. The non-volatile memory device may include a plurality of non-volatile memory cells. The non-volatile memory cell may include electrically erasable programmable read-only memory (EEPROM), flash memory, magnetic RAM (MRAM), spin-transfer torque MRAM, conductive bridging RAM (CBRAM), ferroelectric RAM (FeRAM), PRAM (phase change RAM) also referred to as ovonic unified memory (OUM), resistive RAM (RRAM or ReRAM), nano-tube RRAM, polymer RAM (PoRAM), nano floating gate memory (NFGM), holographic memory, a molecular electronic memory device, or insulator resistance change memory.

As described above, exemplary embodiments of the present general inventive concept may include a red filter, a green filter, and a blue filter. In exemplary embodiments of the present general inventive concept, the red filter may be replaced by one of a cyan filter, a yellow filter, and a magenta filter. The green filter may be replaced by another of the cyan filter, the yellow filter, and the magenta filter. The blue filter may be replaced by the other of the cyan filter, the yellow filter, and the magenta filter.

Passbands of the filters in the exemplary embodiments of the present general inventive concept may be limited to a part of passbands of the filters. That is, each filter may have a particular range or band of wavelengths that may be transmitted by the filter, and wavelengths of light that are not within the range or band of the filter may be reflected and/or absorbed. The filter arrangement in the unit filter array included in the color filter array may be changed according to the exemplary embodiments of the present general inventive concept as disclosed herein.

The color filter array according to exemplary embodiments of the present inventive may detect color information and depth information at the same time, and may adjust and process both information (i.e., color and depth information) correctly. Reliability of the depth information may be improved through the exact adjustment and process of the both information.

Although several embodiments of the present general inventive concept have been illustrates and described, it will be appreciated by those skilled in the art that changes may be made in these embodiments without departing from the principles and spirit of the general inventive concept, the scope of which is defined in the appended claims and their equivalents.

What is claimed is:

1. A color filter array of an image sensor having a plurality of filters, the color filter array comprising:
    a first filter to transmit wavelengths of a first region in a visible light region;
    a second filter to transmit wavelengths of a second region in the visible light region;
    a third filter to transmit wavelengths of a third region in the visible light region; and
    a mixed filter that is an element of the color filter array to transmit wavelengths of at least one of the first region, the second region, and the third region and wavelengths of an infrared region at the same time, the mixed filter being different from a white filter,
    wherein a 2×2 sub-array of the color filter array having the plurality of filters has the first filter, the second filter, the third filter, and the mixed filter, and
    wherein at least one of the first filter, the second filter, and the third filter is a white filter to transmit wavelengths of a visible light region.

2. The color filter array of claim 1, wherein the first filter is a red filter to transmit wavelengths of a red region, the second filter is a green filter to transmit wavelengths of a green region, and the third filter is a blue filter to transmit wavelengths of a blue region.

3. The color filter array of claim 2, wherein the mixed filter transmits the wavelengths of the red region and the wavelengths of the infrared region at the same time.

4. The color filter array of claim 2, wherein the mixed filter transmits the wavelengths of the green region and the wavelengths of the infrared region at the same time.

5. The color filter array of claim 2, wherein the mixed filter transmits the wavelengths of the blue region and the wavelengths of the infrared region at the same time.

6. The color filter array of claim 2, wherein the mixed filter transmits the wavelengths of the red region, the wavelengths of the green region, and the wavelengths of the infrared region at the same time.

7. The color filter array of claim 2, wherein the mixed filter transmits the wavelengths of the red region, the wavelengths of the blue region, and the wavelengths of the infrared region at the same time.

8. The color filter array of claim 2, wherein the mixed filter transmits the wavelengths of the green region, the wavelengths of the blue region, and the wavelengths of the infrared region at the same time.

9. The color filter array of claim 2, wherein the mixed filter transmits the wavelengths of the red region, the wavelengths of the green region, the wavelengths of the blue region, and the wavelengths of the infrared region at the same time.

10. The color filter array of claim 1, wherein the first filter is a cyan filter to transmit wavelengths of a cyan region, the second filter is a yellow filter to transmit wavelengths of a yellow region, and the third filter is a magenta filter to transmit wavelengths of a magenta region.

11. A color filter array of an image sensor having a plurality of filters, the color filter array comprising;
    a white filter to transmit wavelengths of a visible light region;
    a mixed filter that is an element of the color filter array to transmit wavelengths of the visible light region and wavelengths of an infrared light region at the same time, the mixed filter being different from the white filter; and
    two filters among a red filter to transmit wavelengths of a red region in the visible light region, a green filter to transmit wavelengths of a green region in the visible light region, and a blue filter to transmit wavelengths of a blue region in the visible light region,
    wherein a 2×2 sub-array of the color filter array having the plurality of filters has the white filter, the mixed filter, and the two filters.

12. An image sensor comprising:
    the color filter array of claim 1; and
    a plurality of photoelectric conversion elements each being disposed adjacent to one side of the color filter array.

13. The image sensor of claim 12, wherein the first filter is a red filter to transmit wavelengths of a red region, the second filter is a green filter to transmit wavelengths of a green region, and the third filter is a blue filter to transmit wavelengths of a blue region.

14. An image sensor comprising:
    the color filter array of claim 11; and
    a plurality of photoelectric conversion elements each being disposed adjacent to one side of the color filter array.

15. An image processing system comprising:
    the image sensor of claim 12; and
    a processor to control an operation of the image sensor.

16. A pixel array having a plurality of filters, comprising:
    a first filter to transmit wavelengths of a first region in a visible light region;
    a second filter to transmit wavelengths of a second region in the visible light region;
    a third filter to transmit wavelengths of a third region in the visible light region;
    a mixed filter that is an element of the pixel array having the plurality of filters to transmit wavelengths of at least one of the first region, the second region, and the third region, the mixed filter being different from a white filter; and
    at least one photoelectric conversion unit to output signals corresponding to the wavelengths of the first region, the second region, and the third region transmitted by the first filter, the second filter, the third filter, and the mixed filter,
    wherein a 2×2 sub-array of the pixel filter array having the plurality of filters has the first filter, the second filter, the third filter, and the mixed filter, and
    wherein at least one of the first filter, the second filter, and the third filter is a white filter to transmit wavelengths of a visible light region.

17. The pixel array of claim 16, wherein the first filter is a red filter to transmit wavelengths of a red region, the second filter is a green filter to transmit wavelengths of a green region, and the third filter is a blue filter to transmit wavelengths of a blue region.

18. The pixel array of claim 16, wherein the first filter is a cyan filter to transmit wavelengths of a cyan region, the second filter is a yellow filter to transmit wavelengths of a yellow region, and the third filter is a magenta filter to transmit wavelengths of a magenta region.

19. The pixel array of claim 16, wherein the mixed filter transmits wavelengths of an infrared region, and the at least one photoelectric conversion unit outputs signals corresponding to the infrared region transmitted by the mixed filter.

* * * * *